United States Patent
Kim et al.

(10) Patent No.: US 9,722,222 B2
(45) Date of Patent: Aug. 1, 2017

(54) BATTERY MODULE

(71) Applicant: SAMSUNG SDI CO., LTD., Yongin-si, Gyeonggi-do (KR)

(72) Inventors: Tae-Yong Kim, Yongin-si (KR); Seong-Joon Park, Yongin-si (KR); Jong-Han Rhee, Yongin-si (KR); Jun-Woo Cho, Yongin-si (KR); Shi-Dong Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 8 days.

(21) Appl. No.: 14/558,547

(22) Filed: Dec. 2, 2014

(65) Prior Publication Data

US 2015/0162578 A1 Jun. 11, 2015

(30) Foreign Application Priority Data

Dec. 6, 2013 (KR) ........................ 10-2013-0151174

(51) Int. Cl.
*H01M 2/10* (2006.01)
*H01M 2/20* (2006.01)
(Continued)

(52) U.S. Cl.
CPC ....... *H01M 2/1072* (2013.01); *H01M 2/1077* (2013.01); *H01M 2/1217* (2013.01);
(Continued)

(58) Field of Classification Search
CPC ............ H01M 2/10; H01M 2/12; H01M 2/20; H01M 2/1072; H01M 2/206;
(Continued)

(56) References Cited

U.S. PATENT DOCUMENTS

| | | | |
|---|---|---|---|
| 6,365,297 B1* | 4/2002 | Wolczak ............. | H01M 2/1083 429/151 |
| 2011/0097620 A1* | 4/2011 | Kim .................... | H01M 2/1061 429/161 |

(Continued)

FOREIGN PATENT DOCUMENTS

| | | |
|---|---|---|
| JP | 2002-134078 | 5/2002 |
| JP | 2010-205509 | 9/2010 |

(Continued)

OTHER PUBLICATIONS

Tsuchiya, Cluster Battery Pack, JP2002-134078 (English translated abstract), May 10, 2002.*
JP2010205509MT.*

*Primary Examiner* — Alex Usyatinsky
(74) *Attorney, Agent, or Firm* — Lewis Roca Rothgerber Christie LLP

(57) ABSTRACT

A battery module includes a plurality of battery cells, a holder, and a bus-bar. The plurality of battery cells are arranged along one direction, and each of the plurality of battery cells includes a terminal and a vent at an upper surface. The holder is on the plurality of battery cells and has an opening through which the terminal is exposed. The bus-bar is has a portion in the opening of the holder and electrically couples adjacent ones of the plurality of battery cells. The holder includes a bus-bar fastening portion at an area corresponding to the terminal and an exhaust portion at an area corresponding to the vent. The bus-bar fastening portion and the exhaust portion are integrally formed.

9 Claims, 4 Drawing Sheets

(51) Int. Cl.
*H01M 2/12* (2006.01)
*H01M 10/0525* (2010.01)

(52) U.S. Cl.
CPC ......... *H01M 2/1223* (2013.01); *H01M 2/206* (2013.01); *H01M 2/204* (2013.01); *H01M 10/0525* (2013.01); *H01M 2220/20* (2013.01); *Y02E 60/122* (2013.01)

(58) Field of Classification Search
CPC ............. H01M 2/1077; H01M 2/1223; H01M 2/1217; H01M 2220/20; H01M 2/204; H01M 10/0525; Y02T 10/7011
See application file for complete search history.

(56) References Cited

U.S. PATENT DOCUMENTS

| | | | | |
|---|---|---|---|---|
| 2012/0003505 A1* | 1/2012 | Kim | .................... | H01M 2/1077 429/7 |
| 2012/0100401 A1* | 4/2012 | Yasui | .................... | H01M 2/105 429/7 |
| 2012/0114993 A1* | 5/2012 | Park | .................... | H01M 2/1072 429/88 |

FOREIGN PATENT DOCUMENTS

| | | | |
|---|---|---|---|
| JP | 2010205509 MT | * | 9/2010 |
| JP | 2011-253735 | | 12/2011 |
| JP | 2013-051190 | | 3/2013 |

\* cited by examiner

BATTERY MODULE

CROSS-REFERENCE TO RELATED APPLICATION

This application claims priority to and the benefit of Korean Patent Application No. 10-2013-0151174, filed on Dec. 6, 2013 in the Korean Intellectual Property Office, the contents of which are incorporated herein by reference in their entirety.

BACKGROUND

1. Field

An aspect of the present invention relates to a battery module.

2. Description of the Related Art

In general, battery cells are used as energy sources for mobile devices, electric vehicles, hybrid vehicles, and the like. The shape of the battery cell is variously changed or modified depending on the kind of external device to which the battery cell is applied.

In a case where long-time driving and high-power driving are required in an electric vehicle or a hybrid vehicle which consumes a large amount of power, a large-capacity battery module is configured by electrically coupling a plurality of battery cells in order to increase power and/or capacity. The output voltage or output current of the battery module may be increased according to the number of battery cells included in the battery module.

SUMMARY

Embodiments of the present invention provide a battery module in which a bus-bar fastening portion and an exhaust portion, positioned on or over a plurality of battery cells, are integrally formed and a circuit portion is mounted on the battery module, thereby protecting the circuit portion in a degassing situation.

Embodiments of the present invention also provide a battery module in which a bus-bar fastening portion and an exhaust portion are integrally formed so that a more compact design is possible.

According to an embodiment of the present invention, there is provided a battery module, including: a plurality of battery cells arranged along one direction, each of the plurality of battery cells including a terminal and a vent at an upper surface; a holder on the plurality of battery cells, the holder having an opening through which the terminal is exposed; and a bus-bar having a portion in the opening of the holder, the bus-bar electrically coupling adjacent ones of the plurality of battery cells, wherein the holder includes a bus-bar fastening portion at an area corresponding to the terminal and an exhaust portion at an area corresponding to the vent, and wherein the bus-bar fastening portion and the exhaust portion are integrally formed.

The exhaust portion may have a box shape having a space therein, and exhaust openings may be in a lower surface of the exhaust portion corresponding to the vents.

The exhaust portion may include projections corresponding to an inner wall of respective ones of the vents.

One end of the exhaust portion may be closed and another end of the exhaust portion may be open.

The holder may include at least one first fastening portion extending upward from a side of the holder that extends parallel to the one direction along which the battery cells are arranged.

The at least one first fastening portion may include a hook to be coupled to an upper cover.

The holder may include second fastening portions at ends of the holder adjacent to outermost ones of the plurality of battery cells, and the second fastening portions may extend toward the plurality of battery cells.

Each of the second fastening portions may include a hook to be coupled to an end plate.

The holder may include a plastic compound material.

A circuit portion may be on the holder.

According to the present invention, the holder includes the bus-bar fastening portion and the exhaust portion which are integrally formed. The holder is positioned on or over the battery cells, and the circuit portion is mounted on the holder so as to prevent the circuit portion from receiving temperature and chemical influence in a degassing situation, thereby protecting the circuit portion.

Further, the operation of the circuit portion is maintained in a degassing situation, thereby improving the stability of the battery module.

BRIEF DESCRIPTION OF THE DRAWINGS

Example embodiments will now be described more fully hereinafter with reference to the accompanying drawings; however, the present invention may be embodied in many different forms and should not be construed as limited to the embodiments set forth herein. Rather, these embodiments are provided so that this disclosure will be thorough and complete and will fully convey the scope of the example embodiments to those skilled in the art.

In the figures, dimensions may be exaggerated for clarity of illustration. It will be understood that when an element is referred to as being "between" two elements, it can be the only element between the two elements or one or more intervening elements may also be present. Like reference numerals refer to like elements throughout. Further, the use of "may" when describing embodiments of the present invention refers to "one or more embodiments of the present invention."

DETAILED DESCRIPTION

Figure 1:
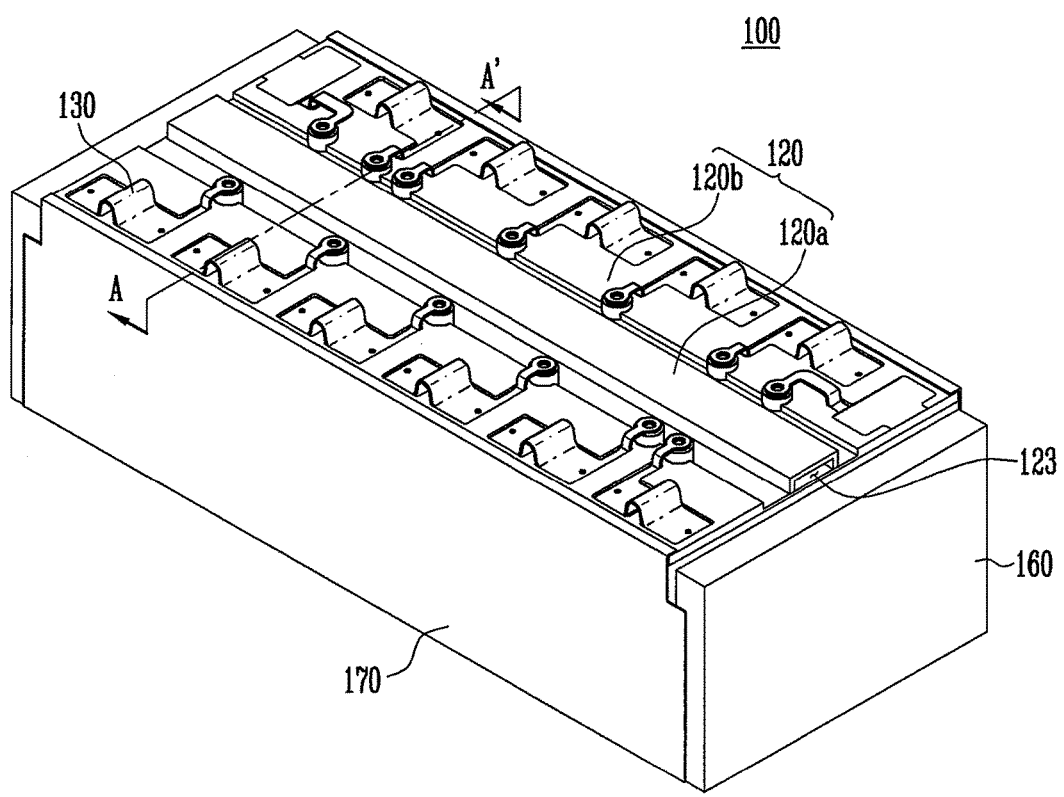
FIG. 1 is a perspective view showing a battery module according to an embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" and/or "coupled to" another element, it can be directly connected or coupled to the other element or be indirectly connected or coupled to the other element with one or more intervening elements interposed therebetween. Hereinafter, like reference numerals refer to like elements. In the drawings, the thickness or size of layers may be exaggerated for clarity and are not necessarily drawn to scale.

Figure 2:
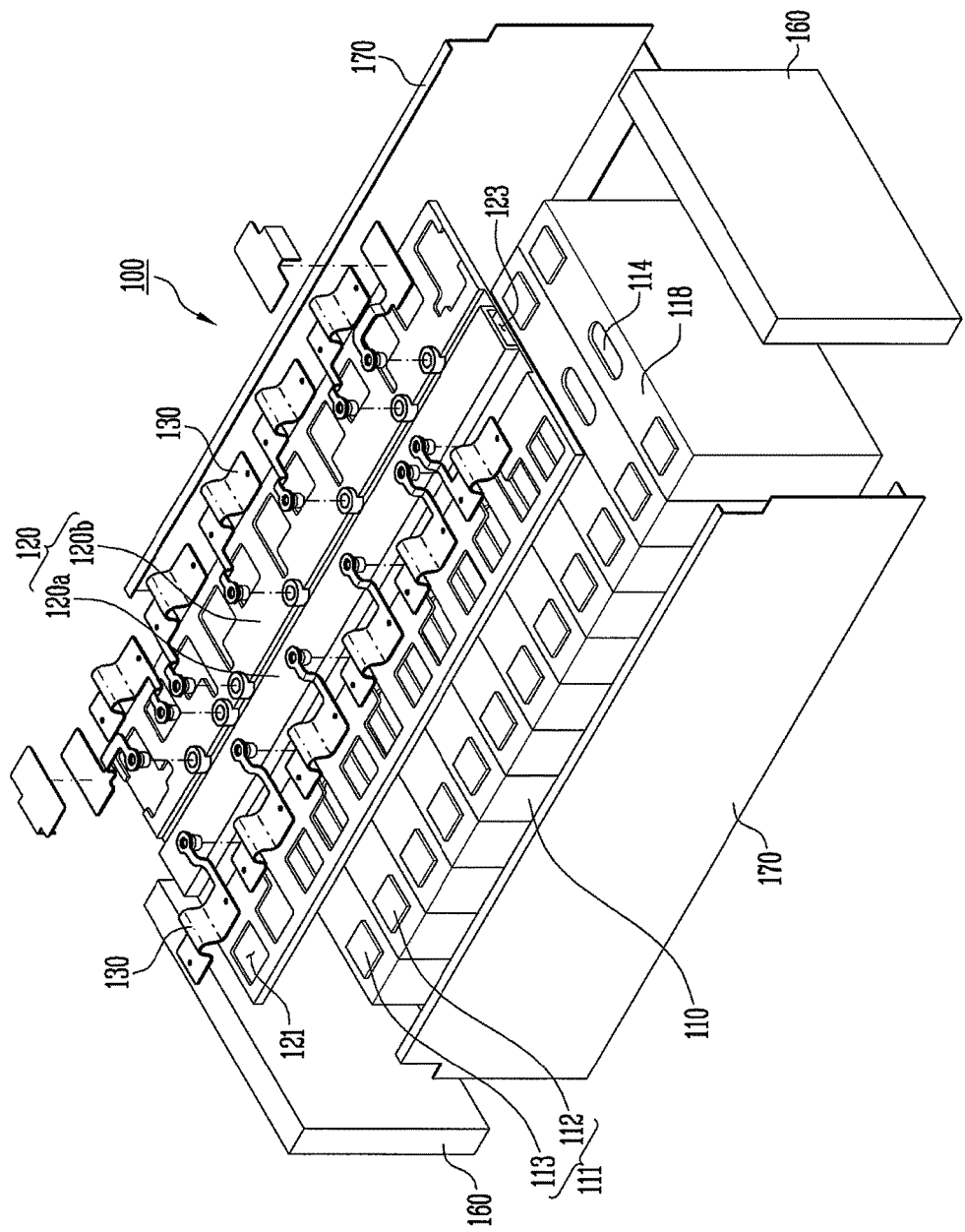
FIG. 2 is an exploded perspective view showing the battery module shown in FIG. 1.

FIG. 1 is a perspective view showing a battery module according to an embodiment of the present invention. FIG. 2 is an exploded perspective view showing the battery module shown in FIG. 1.

Referring to FIGS. 1 and 2, the battery module 100 according to this embodiment includes a plurality of battery cells 110 arranged along one direction, and each of the plurality of battery cells 110 has an upper surface provided with a terminal portion (or terminal) 111 and a vent portion (or vent) 114. The battery module 100 also includes a holder 120 and at least one bus-bar 130. The holder 120 is positioned on or over the plurality of battery cells 110, and the holder 120 has a plurality of openings 121 through which the terminal portions 111 are exposed. The bus-bar 130 has two portions positioned in adjacent ones of the openings 121 of the holder 120 and electrically couples (e.g., electrically connects) adjacent battery cells 110 from among the plurality of battery cells 110. The bus-bar 130 also has a raised portion between and coupling the two portions of the bus-bar 130 in the openings 121.

In this embodiment, the holder 120 includes an exhaust portion 120a formed at an area corresponding to the vent portions 114 and a bus-bar fastening portion 120b formed at an area corresponding to the terminal portions 111. The exhaust portion 120a and the bus-bar fastening portion 120b are integrally formed (e.g., made as a single, continuous, or seamless piece). The exhaust portion 120a is formed in the shape of a box having a space therein, and exhaust openings 127 (see FIG. 4) (e.g., exhaust holes) may be formed at or in a lower surface of the exhaust portion 120a to correspond to the plurality of vent portions 114.

Projection portions (or projections) 124 (see FIG. 4) may be formed to correspond to an inner wall of each of the vent portions 114 and extend from around respective exhaust openings 127 (e.g., may extend from around a periphery of respective exhaust openings 127). The projection portions 124 are inserted into (e.g., extend into) respective vent portions 114 to seal (e.g., to perform a function of sealing) the vent portions 114 so that gas exhausted from each battery cell 110 is controlled (e.g., is not directly exhausted to outside the battery module 100).

One end of the exhaust portion 120a is closed (e.g., sealed), and the other end of the exhaust portion 120a is open. The gas exhausted from each vent portion 114 is exhausted through the open end (e.g., an open area) of the exhaust portion 120a (i.e., a gas outlet 123). The gas exhausted from the battery cells 110 has subacidity and is in a state of high temperature and high pressure. Generally, there may be provided a collection means for collecting the gas exhausted from the battery cells 110. However, according to this embodiment, the exhausted gas is not allowed to move to a top of the battery module 100. Because a circuit portion is mounted on the top of the battery module 100, the gas can be exhausted to the external air without any separate collection means as long as it does not contact the circuit portion (e.g., the gas can be exhausted at any external portion of the battery module 100 other than toward the circuit portion).

The battery module 100 according to this embodiment includes the plurality of battery cells 110 arranged along the one direction. The battery cells 110 are aligned so that wide surfaces of adjacent battery cells 110 face each other.

Each battery cell 110 of the battery module 100 may include a battery case of which one surface is open, and an electrode assembly and an electrolyte are accommodated in the battery case. The electrode assembly and the electrolyte generate energy through an electrochemical reaction therebetween, and the battery case may be sealed at a first surface 118 (e.g., at an upper surface). For example, the upper surface 118 of the battery cell 110 may include a cap assembly. The upper surface 118 of the battery cell 110 is provided with positive and negative electrode terminals 112 and 113 having different polarities and the vent portion 114. The vent portion 114 is a safety device of the battery cell 110 which acts as a passage through which gas generated inside the battery cell 110 is exhausted to the outside of the battery cell 110.

A pair of end plates 160 are respectively provided adjacent to outermost battery cells 110, and a pair of side plates 170 coupling (e.g., connecting) the pair of end plates 160 to each other are respectively disposed at sides of the battery cells 110. The plurality of battery cells 110 may be arranged along the one direction in a space defined by the pair of end plates 160 and the pair of side plates 170.

In this embodiment, the plurality of battery cells 110 are arranged in parallel so that their wide, front surfaces are opposite to (e.g., face) one another, and thus, the positive and negative electrode terminals 112 and 113 of two adjacent battery cells 110 can be electrically coupled through the bus-bar 130 (e.g., the battery cells 110 may be arranged such that the positive electrode terminal 112 of one of the plurality of battery cells 110 and the negative electrode terminal 113 of an adjacent one of the plurality of battery cells 110 are adjacent to each other). The bus-bar 130 may be made of an electrically conductive metal, such as gold, silver, copper, nickel, aluminum, a copper alloy, or an aluminum alloy so as to electrically couple the terminal portions 111. The bus-bar 130 may be bonded to the terminal portion 111 through, for example, welding. In this embodiment, the welding may be, for example, laser welding or ultrasonic welding. The shape of the bus-bar 130 may be variously formed according to the shape and/or position of the terminal portions 111.

In this embodiment, the battery cell 110 is described as a prismatic, lithium ion secondary battery as an example. However, the present invention is not limited thereto and may be applied to various kinds and shapes of batteries, such as a lithium polymer battery.

Figure 3:
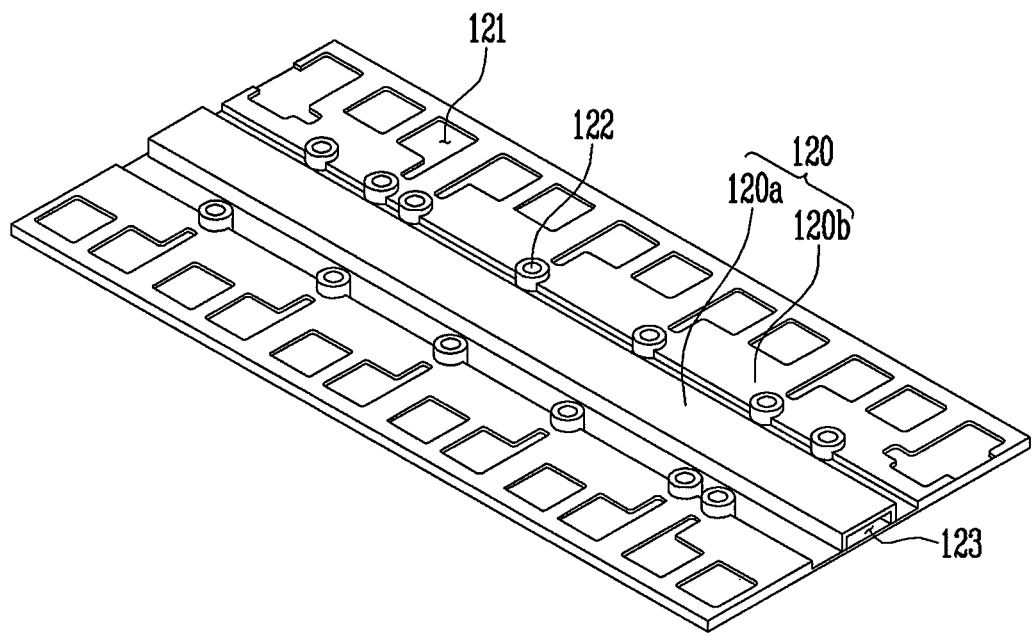
FIG. 3 is a perspective view showing a holder according to the embodiment of the present invention.

FIG. 3 is a perspective view showing the holder according to the embodiment of the present invention.

Referring to FIG. 3, the holder 120 includes a bus-bar fastening portion 120b configured to have openings 121 formed therein and an exhaust portion 120a formed at an area corresponding to the vent portions 114 (see FIG. 2). The bus-bar fastening portion 120b and the exhaust portion 120a are integrally formed. The holder 120 may be made of, for example, a plastic compound material.

The holder 120 is positioned on or over the plurality of battery cells 110, and the openings 121 are formed so that the terminal portions 111 of the battery cells 110 are exposed therethrough. The bus-bar 130, electrically coupling adjacent battery cells 110 from among the plurality of battery cells 110, is positioned in at least one of the openings 121.

Generally, a bus-bar holder has a structure which separates and exhausts gas vented or emitted when a vent portion of a battery cell is fractured. A comparative bus-bar holder is configured with a gasket, a plastic guide wall, and a cover made of plastic or steel, which is very complicated. Therefore, excessive assembly conditions and design limitations exist.

According to embodiments of the present invention, the bus-bar fastening portion 120b and the exhaust portion 120a are integrally formed so that the holder 120 can be more compactly manufactured. Further, a circuit portion can be mounted on the holder 120 so that it is possible to protect the circuit portion in a degassing situation.

Figure 4:
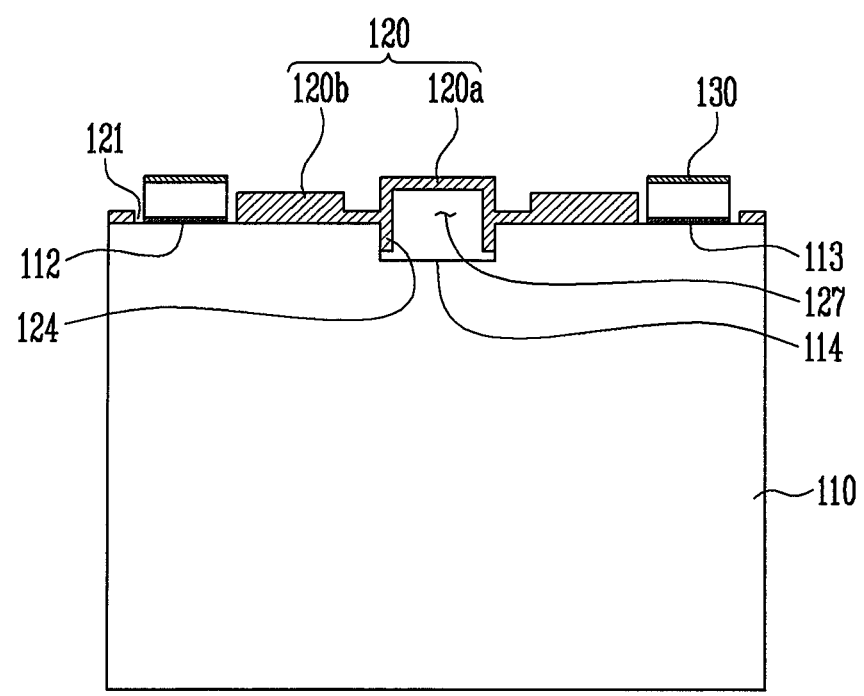
FIG. 4 is a sectional view taken along the line A-A' of FIG. 1.

FIG. 4 is a sectional view taken along the line A-A' of FIG. 1.

Referring to FIG. 4, the holder 120 includes the exhaust portion 120a formed at an area corresponding to the vent portions 114 and the bus-bar fastening portion 120b formed at an area corresponding to the terminal portions 111. The exhaust portion 120a and the bus-bar fastening portion 120b are integrally formed. The exhaust portion 120a is formed in the shape of a box having a space therein, and the exhaust openings 127 may be formed at or in the lower surface of the exhaust portion 120a corresponding to the plurality of vent portions 114. The projection portions 124 are formed to correspond to the inner wall of respective vent portions 114 and extend from around (e.g., extend from a periphery of) respective exhaust openings 127.

Each projection portion 124 is an area or portion inserted into a respective vent portion 114. The projection portions 124 enable gas exhausted from the battery cells 110 not to be leaked directly to the outside of the battery module 100 but to be moved to the gas outlet 123 through the exhaust portion 120a and the exhaust openings 127.

Figure 5:
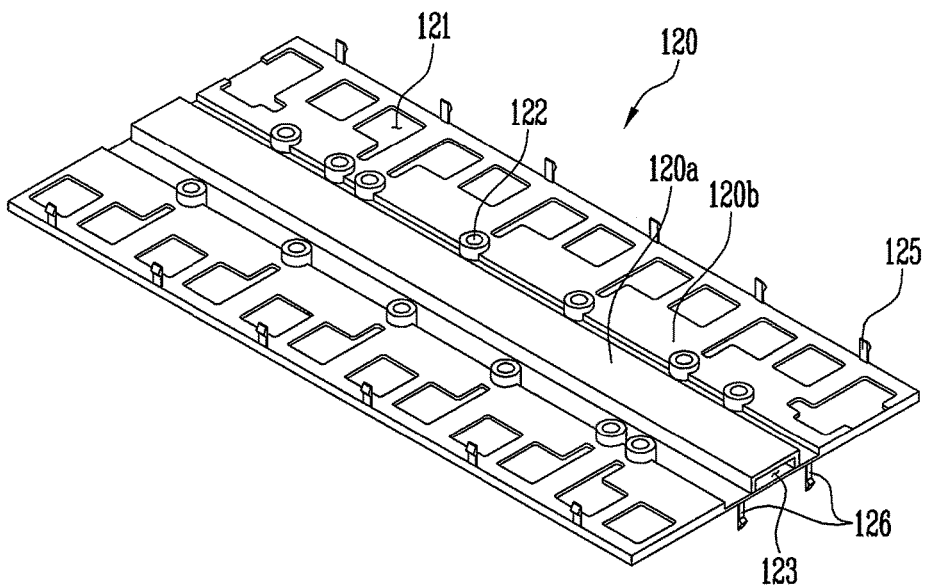
FIG. 5 is a perspective view showing a holder according to another embodiment of the present invention.

FIG. 5 is a perspective view showing a holder according to another embodiment of the present invention.

Referring to FIG. 5, the holder 120 may have at least one first fastening portion 125 extending upward from both end portions (e.g., from both sides) of the holder 120 parallel to the direction along which the battery cells 110 are arranged. The first fastening portion 125 is formed in the shape of a hook. The first fastening portion 125 is configured to be coupled to an upper cover. A first accommodating portion for accommodating the hook may be formed in the upper cover corresponding to the first fastening portion 125.

The holder 120 may have second fastening portions 126 respectively formed at both side surfaces of the holder 120 corresponding to the outermost battery cells 110 (e.g., the second fastening portions 126 may be formed at sides of the holder 120 adjacent to the sides thereof at which the at least one first fastening portion 125 is formed). The second fastening portions 126 are formed to extend toward the battery cells 110. Each second fastening portion 126 is formed in the shape of a hook. The second fastening portions 126 are configured to be coupled to an end plate. Second accommodating portions for accommodating the hooks may be formed in the end plate corresponding to the second fastening portions 126.

Figure 6:
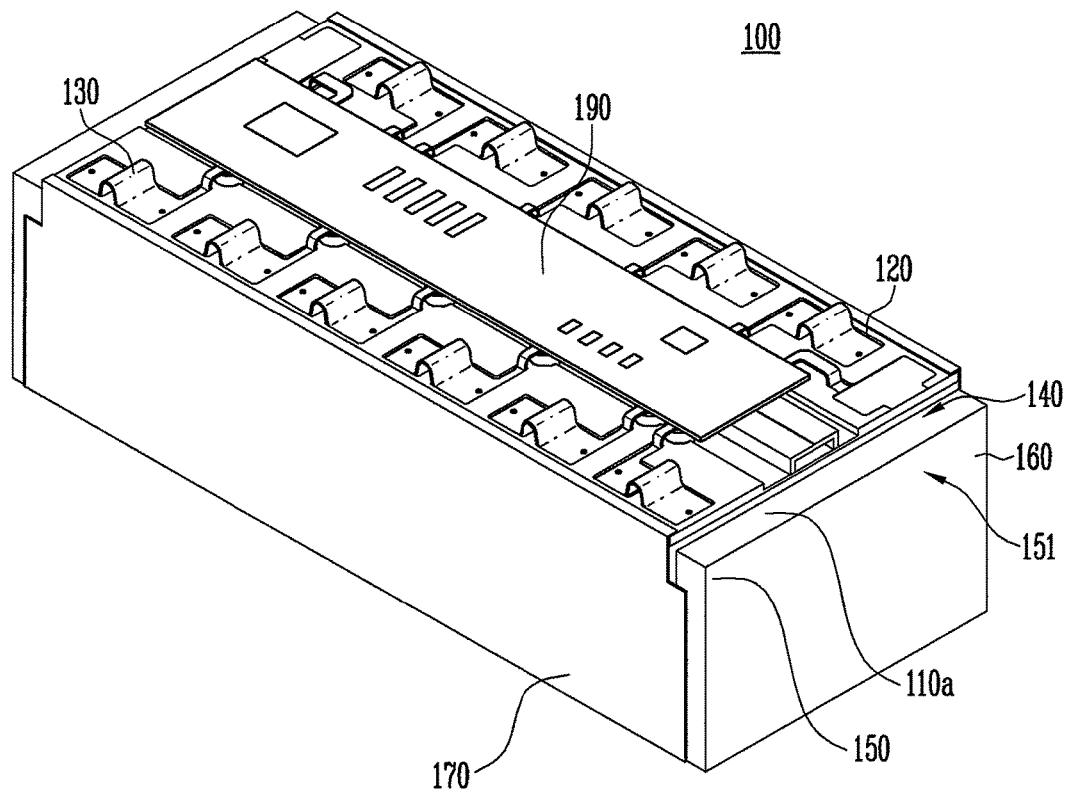
FIG. 6 is a perspective view showing a battery module according to still another embodiment of the present invention.

FIG. 6 is a perspective view showing a battery module according to still another embodiment of the present invention.

Referring to FIG. 6, in this embodiment, the bus-bar fastening portion 120b and the exhaust portion 120a are integrally formed so that the holder 120 can be more compactly manufactured. Further, a circuit portion (or circuit) 190 can be mounted on or above the holder 120 so that it is possible to protect the circuit portion 190 in a degassing situation. Here, the circuit portion 190 may perform some functions of a battery management system (BMS), such as voltage/temperature measurement of the battery cells 110 and balancing of the battery cells 110.

The battery module 100 may include a top plate configured to cover a top of the battery cells 110. In this embodiment, the top plate may cover an upper surface of the battery cells 110 (e.g., may cover a surface of the battery cells 110 at which the terminal portions 111 are provided). Accordingly, it is possible to prevent the terminal portions 111 or the bus-bar 130 from being short circuited with an external conductor. The top plate may be coupled to the side plates 170 through, for example, ultrasonic welding or laser welding.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made to the described embodiments without departing from the spirit and scope of the present invention as set forth in the following claims and their equivalents.

What is claimed is:

1. A battery module comprising:
 a plurality of battery cells arranged along one direction, each of the plurality of battery cells comprising a terminal and a vent at an upper surface thereof;
 a holder on the plurality of battery cells, the holder having an opening through which at least one of the terminals is exposed, an upper surface, and a lower surface, the lower surface of the holder facing the plurality of battery cells, and the holder comprising:
  a bus-bar fastening portion at an area corresponding to the terminals;
  an exhaust portion at an area corresponding to the vents, the exhaust portion having exhaust openings communicating with respective ones of the vents, the bus-bar fastening portion and the exhaust portion being integrally formed; and
  projections extending from the lower surface of the holder at the exhaust portion to correspond to an inner wall of the respective ones of the vents; and
 a bus-bar at least partially in the opening of the holder, the bus-bar electrically coupling adjacent ones of the plurality of battery cells.

2. The battery module of claim 1, wherein the exhaust portion has a box shape having a space therein.

3. The battery module of claim 1, wherein one end of the exhaust portion is closed and another end of the exhaust portion is open.

4. The battery module of claim 1, wherein the holder further comprises a first fastening portion extending upward from a side of the holder that extends parallel to the one direction along which the battery cells are arranged.

5. The battery module of claim 4, wherein the first fastening portion comprises a hook to be coupled to an upper cover.

6. The battery module of claim 1, wherein the holder further comprises second fastening portions at ends of the holder adjacent to outermost ones of the plurality of battery cells, and the second fastening portions extend toward the plurality of battery cells.

7. The battery module of claim 6, wherein each of the second fastening portions comprises a hook to be coupled to an end plate.

8. The battery module of claim 1, wherein the holder comprises a plastic compound material.

9. The battery module of claim 1, wherein a circuit portion is on the holder.

* * * * *